(12) United States Patent
Subbiah et al.

(10) Patent No.: US 7,979,752 B1
(45) Date of Patent: Jul. 12, 2011

(54) DATA LOSS PROTECTION SWITCH SYSTEM AND METHOD

(75) Inventors: Palani Subbiah, San Jose, CA (US); Paul Scott, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1189 days.

(21) Appl. No.: 11/494,408

(22) Filed: Jul. 26, 2006

Related U.S. Application Data (60) Provisional application No. 60/702,738, filed on Jul. 26, 2005.

(51) Int. Cl.
*G06F 11/00* (2006.01)
(52) U.S. Cl. ............... 714/701; 714/760; 714/754
(58) Field of Classification Search ............ 714/701, 714/760, 764, 766, 754; 370/217, 225
See application file for complete search history.

(56) References Cited

U.S. PATENT DOCUMENTS

| | | | | |
|---|---|---|---|---|
| 4,330,885 A | * | 5/1982 | Abbott et al. | 370/217 |
| 5,329,520 A | * | 7/1994 | Richardson | 370/225 |
| 5,982,768 A | | 11/1999 | Bellenger | |
| 6,738,935 B1 | * | 5/2004 | Kimmitt | 714/701 |
| 7,110,633 B1 | * | 9/2006 | Helkey et al. | 385/16 |
| 7,174,561 B2 | * | 2/2007 | Bixby et al. | 725/93 |

OTHER PUBLICATIONS

Cypress HOTLINK II CYV15G0404DXB; Revision**, Revised Jun. 4, 2004; 43 pages.
Cypress Semiconductor Corporation CY7C9335, SMPTE-259M/DVB-ASI Descrambler/Framer-Controller dated Mar. 19, 1999; 7 pages.

* cited by examiner

*Primary Examiner* — Fritz Alphonse (57) ABSTRACT

Systems and methods for data loss protection are presented. In one embodiment, a data loss protection switch includes a first port, a second port, an error threshold management component and a multiplexer. Components of the data loss protection switch cooperatively operate to efficiently protect data. The first port receives information from a first data stream. The second port receives data from a second data stream. The error threshold management component analyzes errors in the first data stream and the second data stream. The multiplexer is controlled by the error threshold management component and selects among the first and second data streams based on the analysis.

16 Claims, 11 Drawing Sheets

DATA LOSS PROTECTION SWITCH SYSTEM AND METHOD

RELATED APPLICATIONS

This Application claims priority to and the benefit of commonly owned U.S. Provisional Patent Application entitled "DATA LOSS PROTECTION SWITCH", Ser. No. 60/702,738, filed on Jul. 26, 2005, which is incorporated herein by this reference.

TECHNICAL FIELD

Embodiments of the present invention relate to the field of signal integrity, and more particularly to systems and methods for data loss protection switches.

BACKGROUND

The following descriptions are not admitted to be prior art by virtue of their inclusion in this section.

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. A number of systems and methods utilize devices communicatively networked together in order to facilitate realization of these beneficial results. However, traditional communication approaches can be susceptible to a number of reliability and/or timing issues.

Conventional video transport networks generally have multiple point-to-point communication links that communicate information from a video source (e.g., cameras, video distribution equipment, production switchers, video routers, video encoders, video decoders and the like) to a video destination (e.g., video monitors, video broadcast equipment, video distribution equipment, production switchers, video routers, video encoders and/or video decoders, etc.). While conventional video transport networks often communicate a significant amount of information, communication failures can result from a variety of causes (e.g., bad cable, bad connectors, poor or no connection, electromagnetic interference, electrostatic discharge, poor signal integrity, and/or high signal attenuation, etc.). Traditional communication links often lack mechanisms to enhance data integrity. For example, if a communication channel fails, typically either no data or erroneous data is received. Moreover, communication links in video broadcast networks are usually unidirectional and there is generally no return path (e.g., between a receiving stage and a previous transmission stage) available to request the original transmitter to retransmit the data in the event of an error. In addition, the temporal nature of live video often makes retransmission impractical.

Figure 1:
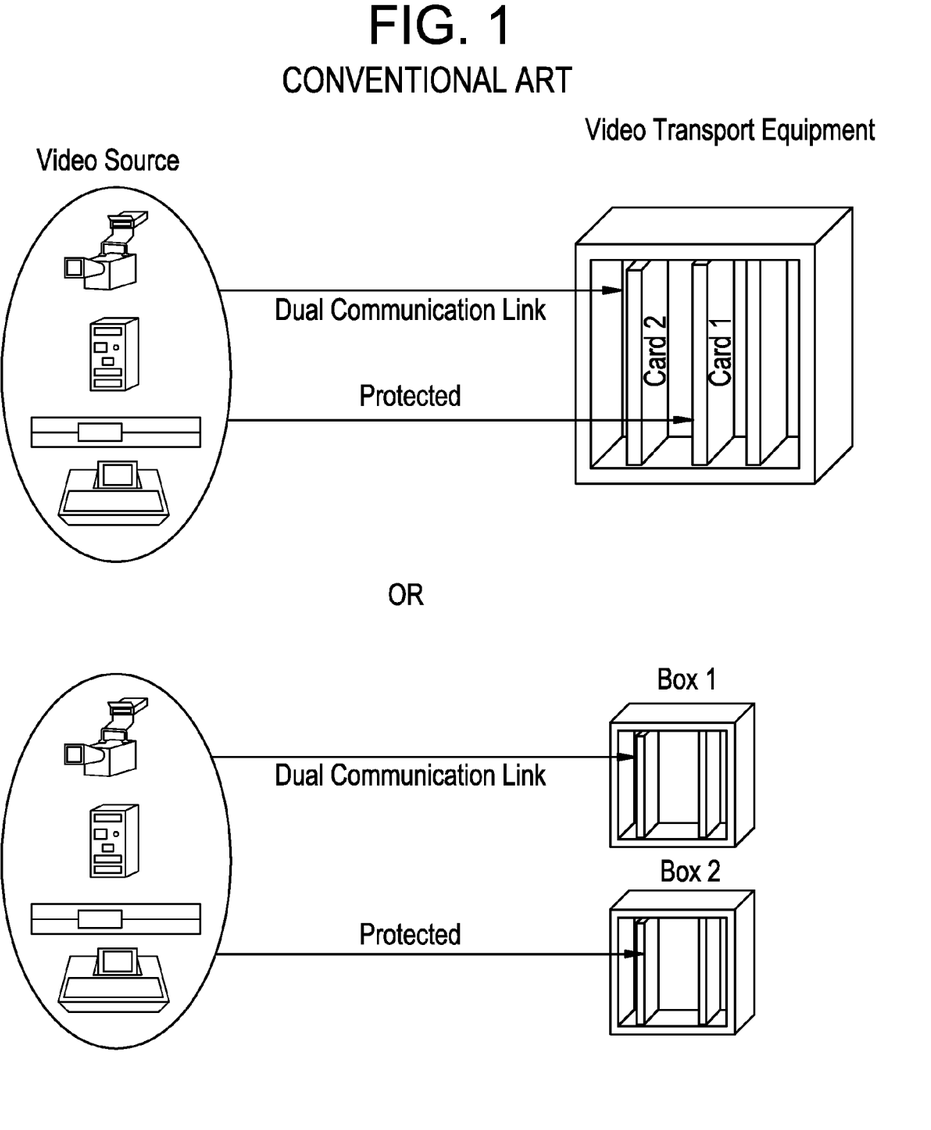
FIG. 1 (Conventional Art) illustrates examples of conventional art arrangements of providing link error recovery in the broadcast video arts.

Traditional attempts at addressing communication errors usually involve delays. In one conventional approach to link error recovery in the broadcast video arts, data is transmitted over two different links to two different line-cards that are located either in the same rack or in two different racks. Conventional Art FIG. 1 illustrates examples of such arrangements. If both links are good, the data from the primary link is fed to the first destination line card through a communication system, which might comprise a backplane of a rack. Whenever there is a bad first link, a link/error monitoring function in the primary line card reports an error signal to the central processing subsystem. The central processing subsystem might be present in the same card, a different card, or a different rack. The central processing subsystem switches to the data received on the alternate second link by the second destination line card.

In addition to utilizing two line cards, such conventional art approaches often involve a relatively significant time delay between a time at which the active line card detects an error and a time at which the second destination line card starts receiving valid data from an alternate link. Traditionally, multiple events generally happen in order for valid data to be successfully recovered and delivered from the alternate link. For example, a primary link line card detects an error condition which is reported to a central processing subsystem. The central processing subsystem sends a stimulus to switch data from the one line card to the other line card. Due to the time required to accomplish this sequence of events, the actual switch-over time is often much longer than desired and/or tolerable. In addition, there is typically significant data loss and/or erroneous data reception.

Figure 2:
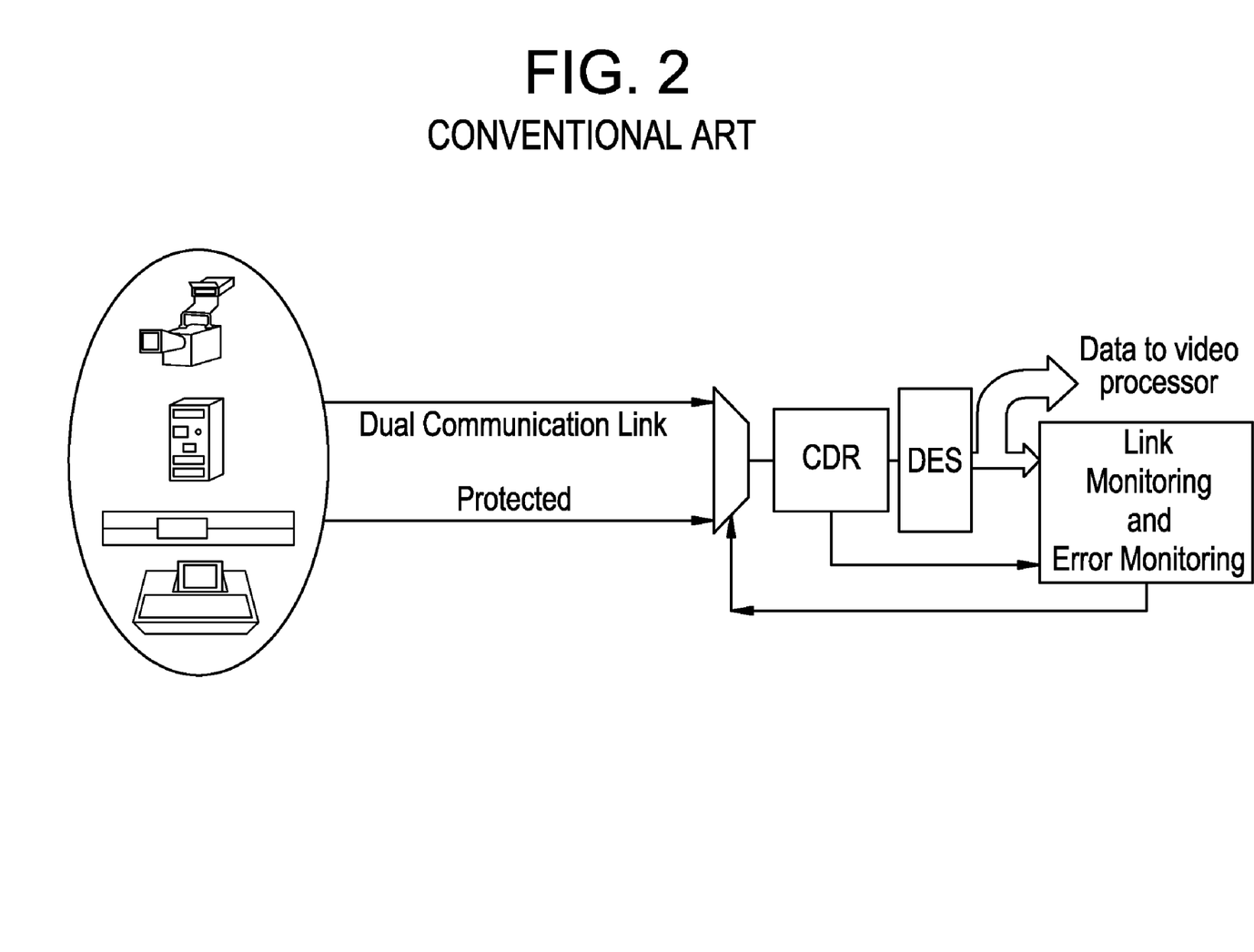
FIG. 2 (Conventional Art) illustrates an alternative example of a conventional art arrangement of providing link error recovery in the broadcast video arts.

Conventional art approaches attempting link error recovery in the broadcast video arts sometimes involve transmitting the same data stream in primary and alternate links. Conventional Art FIG. 2 illustrates an example of this arrangement. At the entry point into the two receiving ports, the primary and secondary links are fed to a 2-to-1 multiplexer. The output of the multiplexer is fed into a clock and data recovery unit. The data recovered from the clock and data recovery unit is de-serialized and fed to the video processing blocks. Whenever the link/error monitoring function reports an error, the select line of the multiplexer is toggled to select the alternate link.

This second conventional art method can also involve a number of issues. In addition to the delay between the occurrence of an error condition and changing a multiplexer select line, this system performs the switch in the serial domain. In addition, generally the approach also allows time for a phase locked loop (PLL) to reacquire lock in order to produce a dock signal for data framing. During this interval, the data to the video processor can be erroneous or lost. Furthermore, the traditional systems typically monitor errors on one link and have not determined if a switch to the alternate link is appropriate (e.g., the alternate link has less errors and/or better connections).

SUMMARY

Accordingly, systems and methods for data loss protection switches are disclosed. In one embodiment in accordance with the present invention, a data loss protection switch includes a first port, a second port, an error threshold management component and a multiplexer. Components of the data loss protection switch cooperatively operate to efficiently protect data. The first port receives information from a first data stream. The second port receives data from a second data stream. The error threshold management component analyzes errors in the first data stream and the second data stream. The multiplexer is controlled by the error threshold management component and selects among the first and second data streams based on the analysis.

BEST MODES FOR CARRYING OUT THE INVENTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Figure 3:
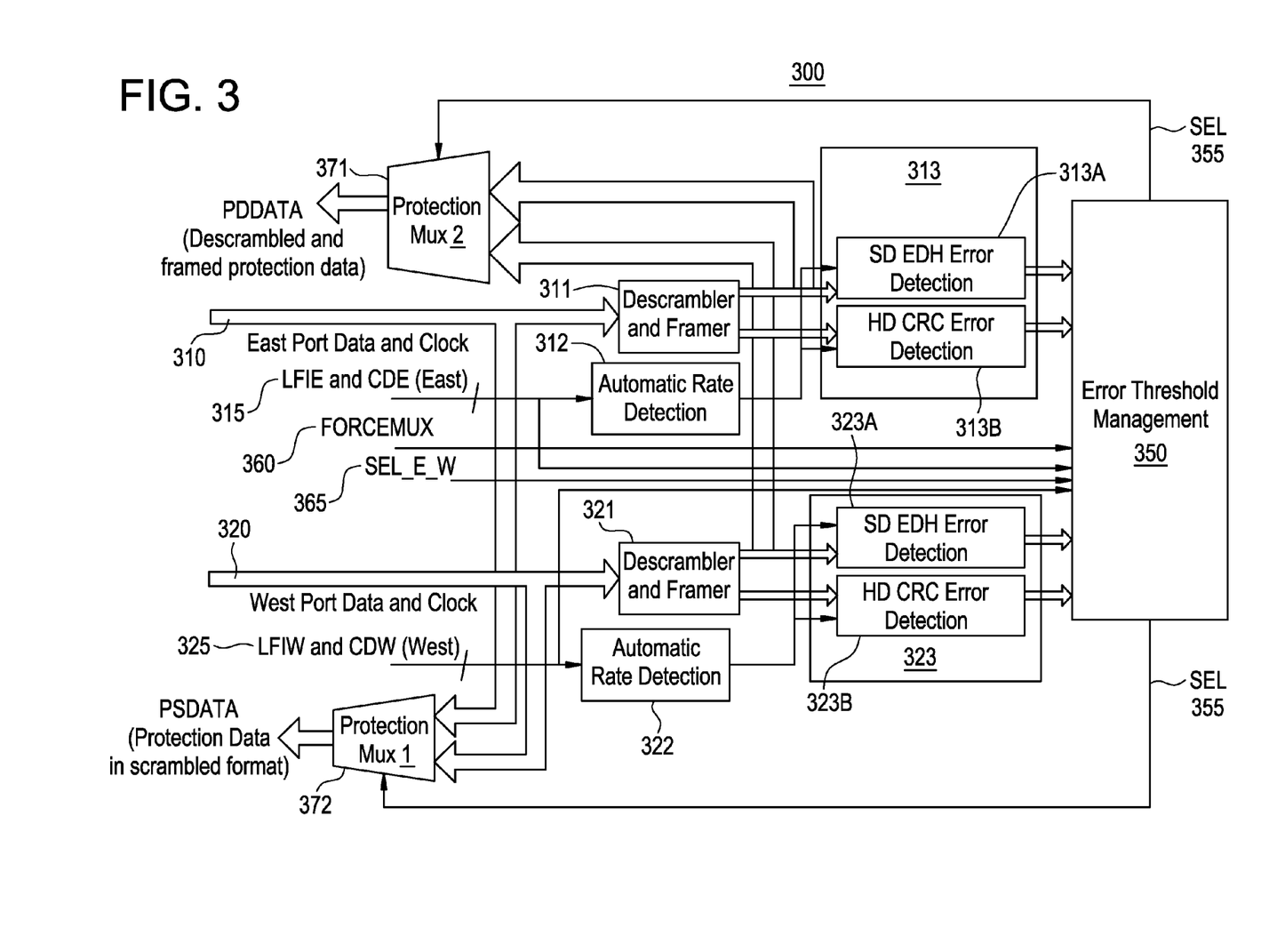
FIG. 3 illustrates a block diagram of a data loss protection switch, in accordance with one embodiment of the present invention.

FIG. 3 is a block diagram illustration of exemplary data loss protection switch 300, in accordance with one embodiment of the present invention. Data loss protection switch 300 includes a first input port 310, a second input port 320, a first descrambler and framer component 311, a second descrambler and framer component 321, a first automatic rate detection component 312, a second automatic rate detection component 322, a first error detection and handling (EDH) component 313, a second error detection and handling EDH component 323, an error threshold management component 350, a first protection multiplexer MUX 371, and a second protection multiplexer MUX 372. In one embodiment, first EDH error detection component 313 includes a first SD EDH error detection component 313A and a first HD CRC error detection component 314, and a second SD EDH error detection component 323 includes a second SD EDH error detection component 323A and a second HD CRC error detection component 323B.

The first input port 310 is coupled to a first descrambler and framer component 311 which is coupled to a first EDH error detection component 313 which is in turn coupled to error threshold management component 350. First protection multiplexer MUX 371 is coupled to error threshold management component 350, first descrambler and framer component 311, and a second descrambler and framer component 321. Second input port 320 is coupled to second descrambler and framer component 321 which is coupled a second EDH error detection component 323 which is in turn coupled to second automatic rate detection component 322 and error threshold management component 350. Second protection multiplexer MUX 372 is coupled to error threshold management component 350, first input port 310 and second input port 320.

The components of exemplary data loss protection switch 300 cooperatively operate to facilitate efficient communication of protected data. First input port 310 and a second input port 320 access deserialized data from primary and alternate (e.g., secondary, tertiary, etc.) serial digital video links. The first input port 310 and a second input port 320 are referred to as East Port Data 310 and West Port Data 320 in one exemplary implementation. In one embodiment, the data streams accessed by first input port 310 and second input port 320 are deserialized. In one exemplary implementation, the deserialization is performed by a pair of 1-to-10 deserializers (e.g., the integrated circuit commercially available under the trademark HOTLINK II™ CYV15GO4O4DXB from Cypress Semiconductor Corporation of San Jose, Calif.). The deserialized 10-bit data from each port (310, 320) can be clocked synchronously into data loss protection switch 300 using a clock that follows the recovered clock from the associated channel (East 310 or West 320). The data streams accessed by first input port 310 and a second input port 320 are forwarded to first protection multiplexer MUX 371, a second protection multiplexer MUX 372, first descrambler and framer component 311, and second descrambler and framer component 321.

In one embodiment, first descrambler and framer component 311 and second descrambler and framer component 321 descramble data. Digital video received by data loss protection switch 300 can be scrambled. For example, serial digital video as specified in Society of Motion Picture Television Engineers (SMPTE) standards is generally transported in a scrambled (e.g., encoded) format. In one embodiment of FIG. 3, the deserialized data streams from the input ports (e.g., 310 and 320) are forwarded to two separate descramblers. A first data stream accessed on first input port 310 is forwarded to first descrambler and framer 311 which descrambles the information and a second data stream accessed on second input port 320 is forwarded to second descrambler and framer 321 which descrambles the information. It is to be appreciated, that while the SMPTE 259M and SMPTE 292M standards document implementations of descramblers that operate on the recovered serial data, the descramblers implemented in one exemplary implementation of FIG. 3 perform operations on the deserialized 10-bit data in a manner that has the same effect as performing deserialization after descrambling.

In one embodiment, first descrambler and framer component 311 and second descrambler and framer component 321 also frame data. In one exemplary implementation, when a new serial link is established, the raw descrambled data does not have character boundaries guaranteed to match the originally transmitted pre-scrambled video data and descrambled data is framed to establish the correct character boundaries. In one embodiment, the framing function is implemented using hardware that detects a bit pattern known as Timing Reference Signal (TRS). Once the TRS is detected, the framer hardware corrects the output character boundaries to match the originally transmitted data. The implementation used for descrambling and framing is very similar to the implementation used in the integrated circuit commercially available under the product designation CY7C9335 from Cypress Semiconductor Corporation of San Jose, Calif.

First automatic rate detection component 312 and second automatic rate detection component 322 are utilized to determine an incoming data rate from a set of supported data-rates. In one embodiment, first automatic rate detection component 312 and second automatic rate detection component 322 include respective automatic rate detection hardware blocks for each channel. The automatic rate detection hardware components (312, 322) sequence through a set of supported frequencies until a stable phase locked loop (PLL) lock is reported by the Clock and Data recovery PLL.

In one embodiment, the automatic rate detection hardware components 312 and 322 select a reference clock frequency from a set of supported frequencies. In one exemplary implementation, the automatic rate detection components select an appropriate reference clock frequency for use by a clock and data recovery phase lock loop (PLL). In one exemplary implementation, the PLL is part of a deserializer component and is used to recover serial data and clock from an incoming serial bit-stream. The automatic rate detection components 312 and 322 can also provide stimulus to the clock configuration circuitry (not shown in FIG. 3). In one exemplary implementation, either a 27 MHz or 74.25 MHz clock signal is output by the clock configuration circuitry. It is appreciated the present invention is compatible with a variety of clock configuration techniques. For example, the clock configuration circuitry can be built either using a programmable clock with configurable frequency or multiple reference oscillators with a selection multiplexer.

A first data stream received on input port 310 is operated on by first automatic rate detection component 312 and a second data stream received on input port 322 is operated on by automatic rate detection component 322. In one embodiment, the automatic rate detection components 312 and 322 use the PLL-lock status output from the clock and data recovery PLL (e.g., a Link Fault Indicator from the integrated circuits commercially available under the trademark Independent Channel HOTLINK II™ from Cypress Semiconductor Corporation of San Jose, Calif.) and carrier detect output from an input equalizer (if present) to operate its state machine that determines the incoming data rate from a set of supported data-rates. The automatic rate detection components 312 and 322 can auto configure to a variety of data rates. For example, one embodiment of the present invention can auto configure to SMPTE 259M-C data rates, SMPTE 292M data rates, etc.

In one embodiment, the two error detection and handling (EDH) components 313 and 323 (e.g., one per channel) detect errors. The components 313 and 323 can operate independently of each other. For example, error detection and handling component 313 processes a first data stream received on input port 310 and error detection and handling component 323 processes a second data stream received on input port 320. In one exemplary implementation, the EDH error detection components 313 and 323 are enabled when the automatic rate detection components in the associated channel determines that the received serial input matches a selected data rate (e.g. a data rate corresponding to SMPTE 259M-C, etc). The EDH error detection block may follow SMPTE recommendations as specified in SMPTE RP-165, for example. Detected errors are reported to error management component 350.

It is appreciated error detection and handling components 313 and 323 can be readily adapted to perform a variety of error detection and handling techniques. In one embodiment, error detection and handling component 313 includes SD EDH error detection component 313A and HD CRC Error Detection component 313B and error detection and handling component 323 includes SD EDH error detection component 323A and HD CRC Error Detection component 323B. It is appreciated error detection and handling components 313 and 323 can be readily adapted to perform a variety of CRC error analysis.

CRC Error Detection component 313B and CRC Error Detection component 323B (e.g., one per channel) can operate independent of each other. For example, CRC Error Detection component 313B performs error detection on a first data stream received on first input port 310 and CRC Error Detection component 323B performs error detection on a second data stream received on second input port 320. The cyclic redundancy check (CRC) calculations are performed on the received video data, and the resulting CRC check word is compared to the transmitted CRC check word. Whenever there is a mismatch between these two values an error is reported to the error management block 350. Error management block 350 further comprises a sub block for determining the type of video signal (e.g., PAL, NTSC). This function is generally used to determine the location of the CRC check words, since such location generally varies depending on the type of video stream. In one exemplary implementation, if the incoming data does not have embedded CRC check words, the hardware can report timing reference signal (TRS) errors. In one exemplary implementation, a TRS error is reported whenever a TRS sequence is not found in the expected location for the determined video format.

In one embodiment, the CRC error detection components 314 and 324 perform error detection associated with SMPTE 292M when the automatic rate-detection component in the associated channel (e.g., a data stream received on input port 310 or 320) determines that the serial input matches the data rate for SMPTE 292M. The CRC error detection components 314 and 324 follow the specification of SMPTE 292M in one exemplary implementation. The CRC calculations are performed on the received video data, and the resulting CRC check word is compared to the transmitted CRC check word. Whenever there is a mismatch between these two values an error is reported to the error management component 350.

In one embodiment, CRC Error Detection components 314 and 324 include a sub component that determines a type of High Definition (HD) video format (e.g., 1080i 60 Hz, 720p 50 Hz, and 720p 60 Hz). This function is generally used to determine the location of the CRC check words, since such location typically varies depending on the type of HD video format. If the incoming data does not have embedded CRC check words, the hardware reports TRS errors. A TRS error is reported whenever the TRS sequence is not found in the expected location for the determined video format.

The error management component 350 controls outputs of switch 300 based upon input error information. In one embodiment, error management component 350 counts the number of errors, determines an error ratio (e.g., number of errors in a given window of data, etc), determines another measure of quality of a data stream and also controls the protection multiplexers 371 and 372 based on the amount of errors or density of errors detected on data streams received on each input port (e.g., 310 or 320).

In one embodiment, error management component 350 accesses several inputs in order to determine the value of the select line for the protection multiplexer(s). A first set of input signals to error management component 350 include Link Fault Indicator (LFI) signals. In one exemplary implementation, a LFI signal represents a "PLL Out-of-Lock" condition from the Clock and Data Recovery PLL of the associated input port. This output can be provided by the deserializer that is interfaced to the video protection switch interfaces (e.g., integrated circuit commercially available under the trademark HOTLINK$_{11}$™ Transceiver from Cypress Semiconductor Corporation of San Jose, Calif.).

A second set of signals may be input to error management component 350. In one exemplary implementation, a Carrier Detect (CD) signal from equalizers (not shown in FIG. 3) associated with both first input port 310 and second input port 320 may be accessed by error management component 350 (if equalization is present).

In one embodiment, a third set of input signals can be accessed by error management component 350. In one exemplary implementation, the third set of input signals include error status signals from the CRC detection components 313B and 323B components associated with input ports 310 and 320 respectively for SMPTE 292M, or error status from the SD EDH detection 313A and 323A components of both associated with input ports 310 and 320 respectively for SMPTE 259M. In one exemplary implementation, the input is selected from either the SMPTE 259M EDH block or SMPTE 292M CRC block as determined by the automatic rate detection block.

Error management component 350 also determines when the select line for the Protection Multiplexers 371 and 272 changes to pass traffic from the alternate link. It is appreciated the present invention is readily adapted to control changes to alternate links based upon a variety of link quality and/or error determination techniques.

In accordance with one embodiment of the present invention, a first method for protection switching uses link fault indicator (LFI) based switching. In one exemplary implementation, link fault indicators from the first input port 310 and the second input port 320 channels are used to determine which data is routed to the output of the protection multiplexers (e.g., 371, 372, etc.). In one embodiment, link fault indicator status outputs from deserializers associated with the input ports 310 and 320 are utilized to determine which data is routed to the output of the protection multiplexers. In one exemplary implementation, link fault indicators on a currently selected channel are sampled as "faulty" on one port for a few cycles, (e.g. 10 cycles, 15 cycles, 17 cycles, etc) and as "good" on the other port for a few cycles before the switch over happens. This ensures that false switching does not occur.

Figure 4:
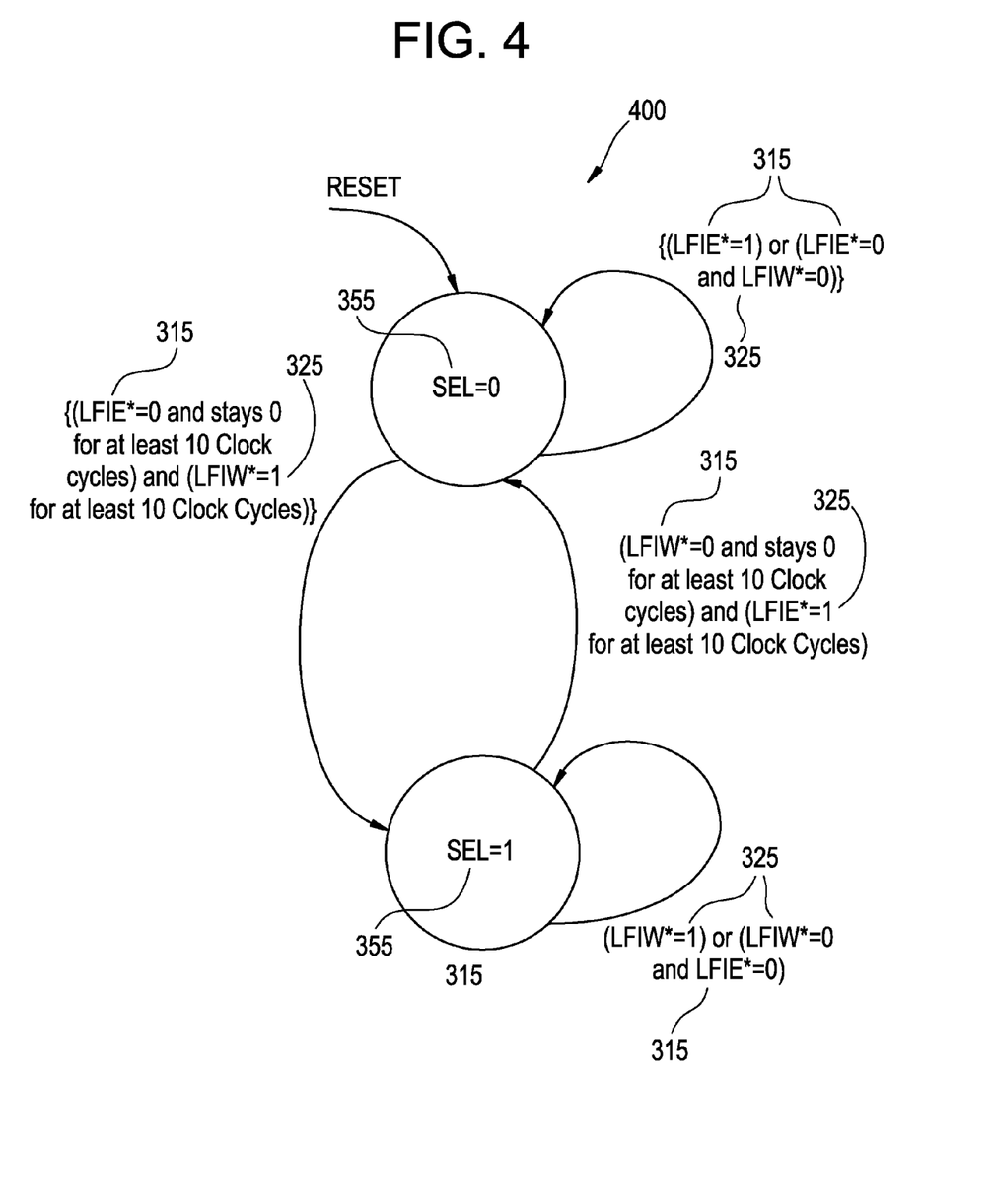
FIG. 4 illustrates a state machine for determining a value of the select line for protection multiplexers, in accordance with one embodiments of the present invention.

In one embodiment of the present invention, state machines are utilized to in determining which data stream is output from a protection multiplexer. FIG. 4 is a block diagram of exemplary state machine 400 in accordance with one embodiment of the present invention. State machine 400 determines a value of the select line for the protection multiplexers. It is appreciated that state machine 400 is a synchronous state machine that can be clocked by a variety of clock signals that may or may not be synchronous to either of the port clocks and can be a fairly high frequency (e.g., greater than 10 MHz).

In one embodiment, signal line fault indication error (LFIE) is active LOW. In one exemplary implementation, signal LFIE 315 corresponds to a link fault indicator for serial data output from a deserializer associated with the first input port 310. The signal is active (e.g., LOW) whenever the clock and data recovery PLL of the first input port 310 is out-of-lock. Similarly, in one exemplary implementation, signal LFIE 325 corresponds to a link fault indicator for serial data output from deserializer associated with the second input port 320. The signal is active (e.g., LOW) whenever the clock and data recovery PLL of the second input port 320 is out-of-lock. The RESET signal can be an active HIGH system reset.

In one embodiment, state machine 400 has one output, protection multiplexer selection signal (SEL) 355. When SEL 355 is a logical 0 (e.g., low), the output of the protection multiplexer 372 (shown as PSDATA in FIG. 3), is a buffered and delayed version of data from first input port 310. The output of protection multiplexer 371 (shown as PDDATA in FIG. 3) is a buffered and delayed version of descrambled and framed data from first input port 310.

In one embodiment, when SEL 355 is a logical 1 (e.g., high), the output of the protection multiplexer 372 (shown as PSDATA in FIG. 3), is a buffered and delayed version of data from second input port 310. The output of protection multiplexer 371 (shown as PDDATA in FIG. 3) is a buffered and delayed version of descrambled and framed data from second input port 310.

In one embodiment, the state machine 400 optionally may be bypassed and the value of a protection multiplexer select line (e.g., SEL) can be forced to select a data stream from either first input port 310 or second input port 320, in accordance with alternate embodiments of the present invention. In one exemplary implementation, when the value of signal FORCEMUX 360 is a logical 1, the value of SEL 355 is controlled by SEL_E_W. When SEL_E_W 365 is a logical 0 (low) the value of SEL 355 is forced to 0. When SEL_E_W 365 is a logical 1 the value of SEL 355 is forced to 1. When FORECEMUX 360 is a logical 0, the value of SEL 355 is controlled by the state machine.

In accordance with embodiments of the present invention, a second method for protection switching is known as cyclic redundancy check (CRC) error based switching. This method is an advanced method using CRC error detection. In one embodiment, it is more robust than the Link Fault Indicator based switching method as the CRC error condition is usually an earlier indication of a failing or faulty link than the Link Fault Indicator. Moreover, a Link Fault Indicator can remain unasserted even in the presence of significant errors in the data.

In one exemplary implementation, a rate of CRC errors is utilized to determine the value of the select line for the multiplexer. If there are at least n CRC errors in a span of N CRC words, a change to an alternate input port is executed provided that the alternated link did not have a ratio of m CRC errors in a span of M CRC words that is greater. In one embodiment, the n errors per N instances is know as or referred to as the "CRC Error criterion for becoming an inactive link" and is represented as signal CRCERR_inactive_x (x corresponds to first input port 310 or second input port 320). In one embodiment, the m errors per M instances is known as or referred to as the "CRC Error criterion for becoming the active link" and is represented as signal CRCERR_active_x (again x corresponds to first input port 310 or second input port 320). It is appreciated the variables N, n, M, m can be altered or derived based on a variety of performance requirements.

Figure 5:
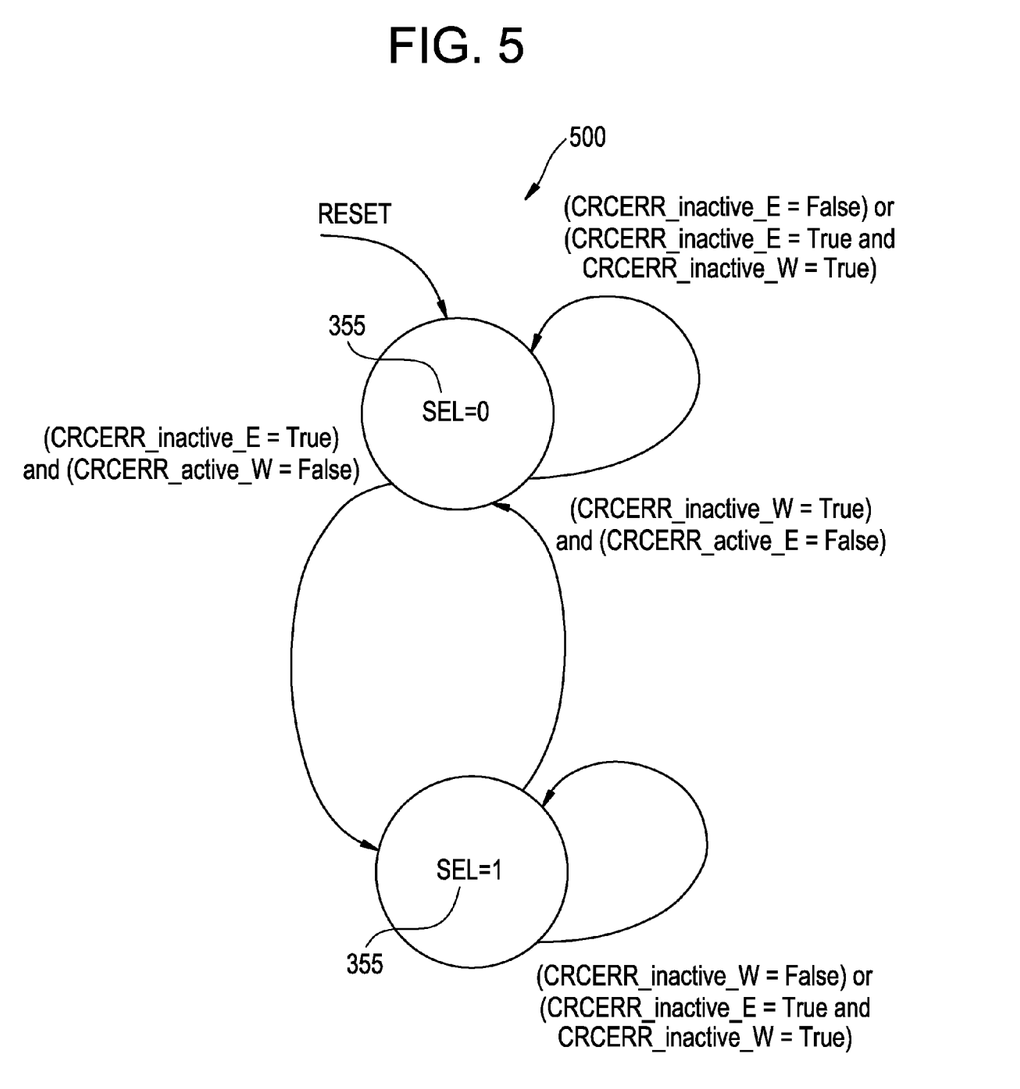
FIG. 5 illustrates a state machine for determining a value of the select line for protection multiplexers based on CRC errors, in accordance with one embodiment of the present invention.

A state machine 500 for determining the value of the select line of the protection multiplexers (e.g., 371, 372, etc.) based on CRC errors is shown in FIG. 5, in accordance with one embodiment of the present invention. This synchronous state machine 500 can be run with a high-speed clock that is asynchronous to both east port and west port clock. Table 1, below, describes the signals of state machine 500.

| Signal Name | Description |
| --- | --- |
| CRCERR_inactive_E | This signal is asserted HIGH whenever the East channel CRC error detection or EDH error detector has detected greater n CRC errors in a window of N CRC words and remains HIGH until there is a window of N CRC words that have less than n CRC errors. This signal is also HIGH whenever there is a loss-of-signal or loss-of-framing condition in the East channel that does not allow the receiver CRC calculations to begin. |
| CRCERR_inactive_W | This signal is asserted HIGH whenever the West channel CRC error detection or EDH error detector has detected greater n CRC errors in a window of N CRC words and remains HIGH until there is a window of N CRC words that have less than n CRC errors. his signal is also HIGH whenever there is a loss-of-signal or loss-of-framing condition in the West channel that does not allow the receiver CRC calculations to begin. |
| CRCERR_active_E | This signal is asserted HIGH whenever the East channel data has detected at least m CRC errors in a window of M CRC words and remains HIGH until there is a window for M CRC words that have less than m CRC errors. This signal is also HIGH whenever there is a loss-of-signal or loss-of framing condition in the East channel that does not allow the receiver CRC calculations to happen. |
| CRCERR_active_E | This signal is asserted HIGH whenever the East channel data has detected at least m CRC errors in a window of M CRC words and remains HIGH until there is a window for M CRC words that have less than m CRC errors. This signal is also HIGH whenever there is a loss-of-signal or loss-of framing condition in the East channel that does not allow the receiver CRC calculations to happen. |

It is to be appreciated that CRC calculations for the first East 310 and second West 320 channels can run in different clock domains (e.g., east clock and west clock respectively). Hence the CRCCERR_inactive_x (e.g., x=East 310 or West 320) and CRCERR_active_x (e.g., x=East 310 or West 320) signals from each channel are brought to a common system clock domain that is asynchronous in frequency and phase to either the East clock or West clock. In one exemplary implementation, these signals are updated at a very low rate (once per N or M video lines or frames) and it is acceptable to asynchronously sample these signals with a fairly high speed system clock (greater than about 10 MHZ) before feeding it into the state machine 500 which can also run off the same system clock.

In accordance with embodiments of the present invention, a third method for protection switching is known as CRC Error and LFI based switching. In one embodiment, this method is more robust than the first two methods. It uses a combination of CRC errors and LFI to determine the setting of the select line of the protection multiplexers (e.g., 371, 372, etc.).

This method uses both LFI and CRC error detection to determine the value of the select line for the respective protection multiplexers. CRC error criterion signals and the input signals are the same signals that are generated or provided for the previous two methods (LFI based protection switching or CRC Error Detection based protection switching). The description of SEL and FORCEMUX in previous two methods applies to this method as well.

Figure 6:
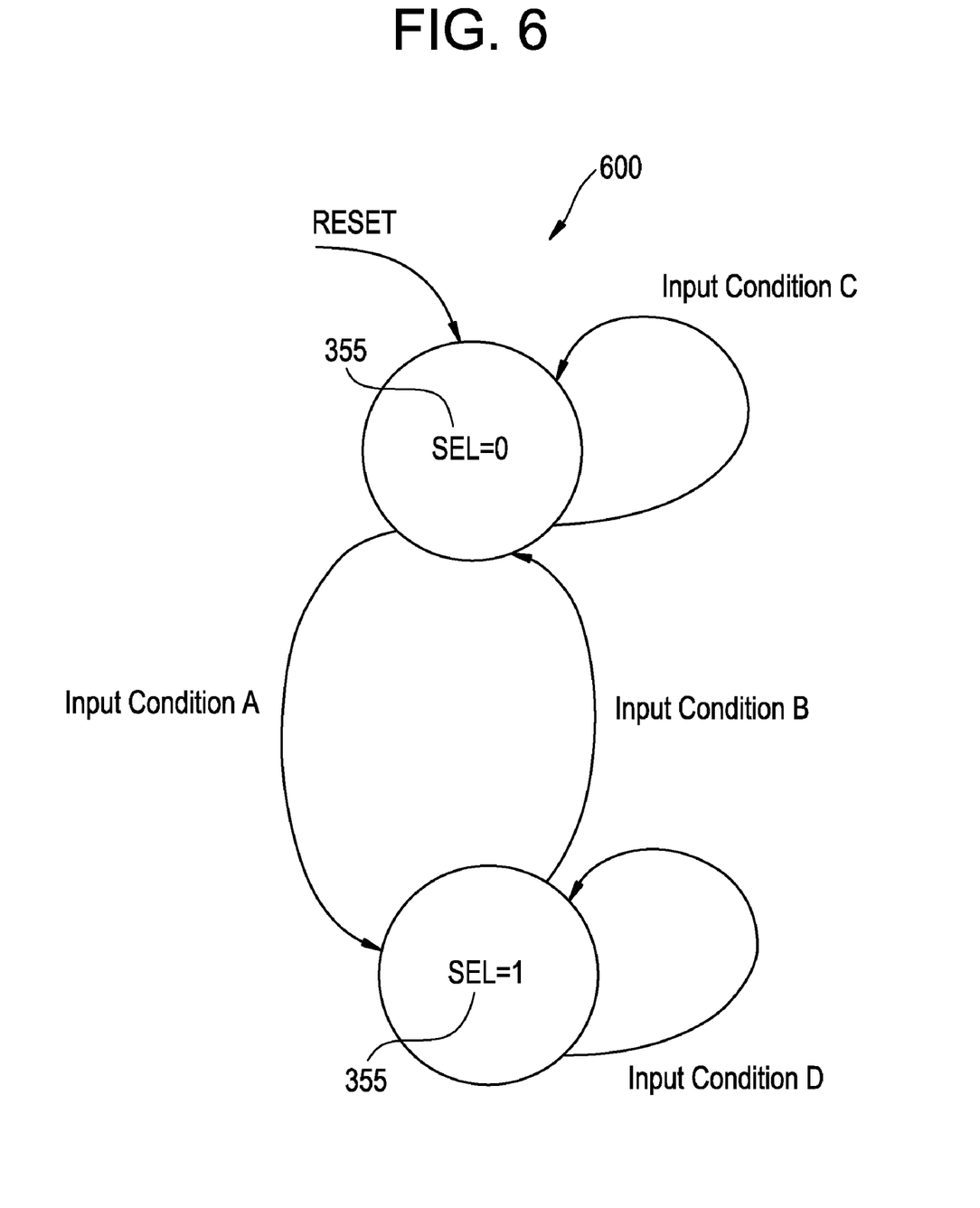
FIG. 6 illustrates a state machine for determining a value of the select line for protection multiplexers based on CRC errors and LFI status, in accordance with one embodiment of the present invention.

A state machine 600 for determining the value of the select line of the multiplexer based on CRC errors and LFI status is shown in FIG. 6, in accordance with one embodiment of the present invention. This synchronous state machine should operate with a high-speed clock that is asynchronous to both the first input East port 310 and second input West port 320 clocks. The state machine outputs are the same as the previously described method (e.g., CRC error detection based protection switching).

In one embodiment state machine 600 controls the transitions in a protective multiplexer selection indication (e.g., SEL 355). In one exemplary implementation protection SEL 355 includes four transitions. The four transitions in a multiplexer are triggered by input conditions A, B, C, and D. Input conditions A, B, C, and D corresponds to error indications from respective input ports (e.g., 310 and 320).

Responsive to input condition A, the output SEL 355 changes from a zero to a one value in one embodiment. In one exemplary implementation, input condition A is expressed as: ((LFIE 315*=LOW and stays LOW for at least 10 Clock cycles) and (LFIW 325*=HIGH for at least 10 Clock Cycles)) or ((LFIE 315*=HIGH and LFIW 325*=HIGH for at least 10 Clock Cycles) and (CRCERR_inactive_E=True) and (CRCERR_active_W=False)).

Responsive to input condition B, the output SEL 355 changes from a one to a zero value in one embodiment. In one exemplary implementation, input condition B is expressed as: ((LFIW 325*=LOW and stays 0 for at least 10 Clock cycles) and (LFIE 315*=HIGH for at least 10 Clock Cycles)) or ((LFIW 325*=HIGH and LFIE 315*~=HIGH for at least 10 Clock Cycles) and (CRCERR_inactiveW=True) and (CRCERR_activeE=False)).

Responsive to input condition C, the output SEL 355 remains at a zero value in one embodiment. In one exemplary implementation, input condition C is expressed as: ((LFIE 315*=HIGH and LFIW 325*=HIGH) and (CRCERR_inactive_E=True) and (CRCERR_inactive_W=True)) or (LFIE 315*=HIGH and CRCERR_inactive_E=FALSE) or (LFIE 315*=LOW and LFIW 325*=LOW).

Responsive to input condition D, the output SEL 355 remains at a one value in one embodiment. In one exemplary implementation, input condition D is expressed as: ((LFIE 315*=HIGH and LFIW 325*=HIGH) and (CRCERR_inactive_E=True) and (CRCERR_inactive_W=True)) or (LFIW 325*=HIGH and CRCERR_inactive_W=FALSE) or (LFIE 315*=LOW and LFIW 325*=LOW).

It is appreciated that embodiments in accordance with the present invention are well suited to utilizing a variety of methods, including any or all of the above listed methods (e.g., giving a user an option to select from a variety of methods).

Figure 7:
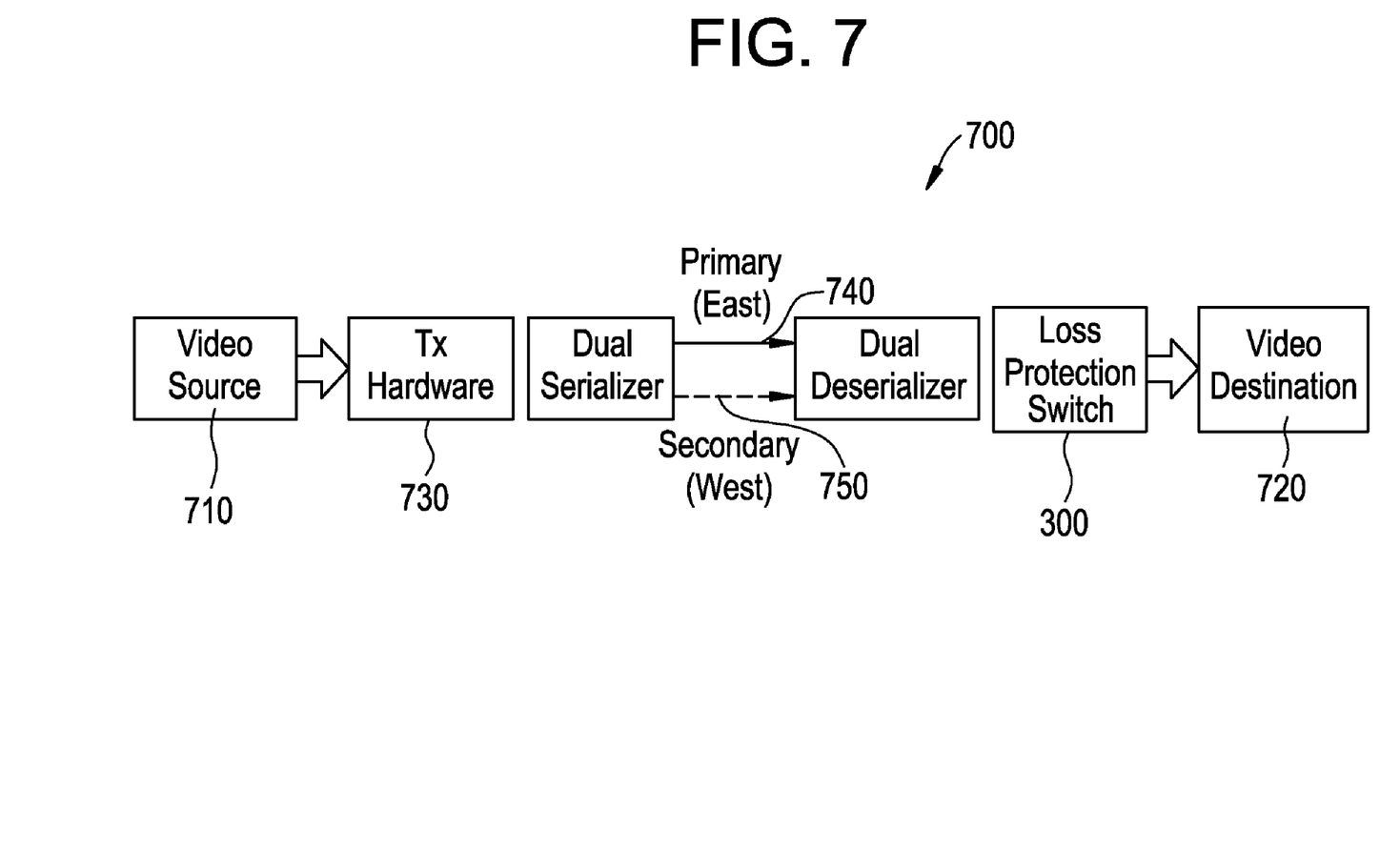
FIG. 7 illustrates a top-level block diagram of an exemplary application of a data loss protection switch, in accordance with one embodiment of the present invention.

FIG. 7 illustrates a top-level block diagram 700 of an exemplary application of a data loss protection switch, in accordance with one embodiment of the present invention. Each video source 710 (e.g., a video router, switch, etc.) is typically coupled to a video destination 720, (e.g., a broadcast server, intermediate node, etc.) through a single link. In the event of a triggering error condition, data loss protection switch 300 provides a near instantaneous switch-over from an active link to an alternate link. The transmission hardware 730 is used to provide two copies of the transmit video source and to optionally insert CRC check words into the stream. Either of the links (740, 750) in the solution may be regarded as primary or secondary. The application shown in FIG. 7 can have a variety of variations. The variations can depend on whether the communication between the data loss protection switch 300 to the video destination 720 is long distance, (e.g., across two different cards or two different racks, etc.) or short distance (e.g., a few inches of PCB trace, etc).

Figure 8:
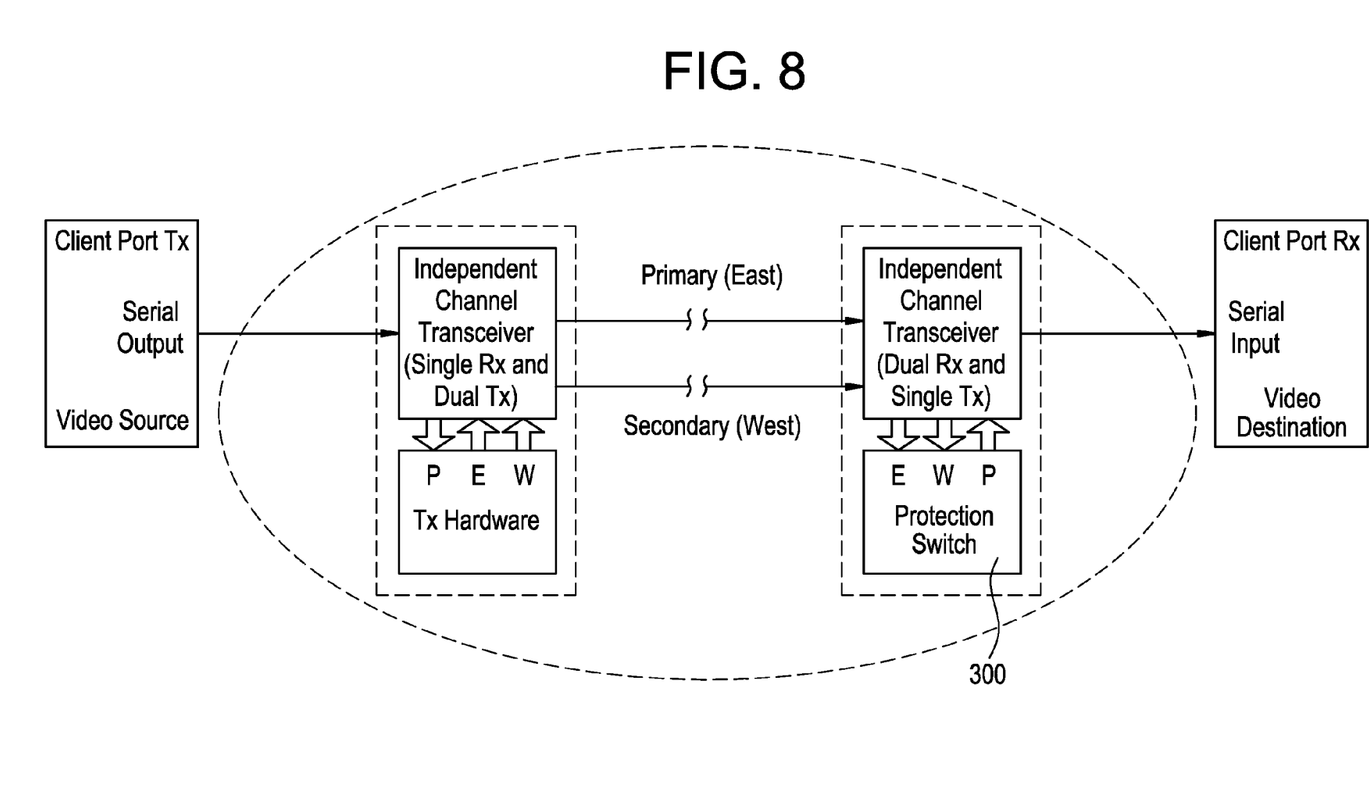
FIG. 8 illustrates a long distance configuration of an exemplary application of a data loss protection switch, in accordance with one embodiment of the present invention.

FIG. 8 illustrates a long distance configuration, in accordance with one embodiment of the present invention. In one exemplary implementation, the protection data from protection multiplexer 371 and/or 372 (shown in FIG. 3) can be serialized using a 10-to-1 serializer as previously described with respect to FIG. 3. The data from the serializer output is transmitted to the video destination that has a serial input port.

Figure 9:
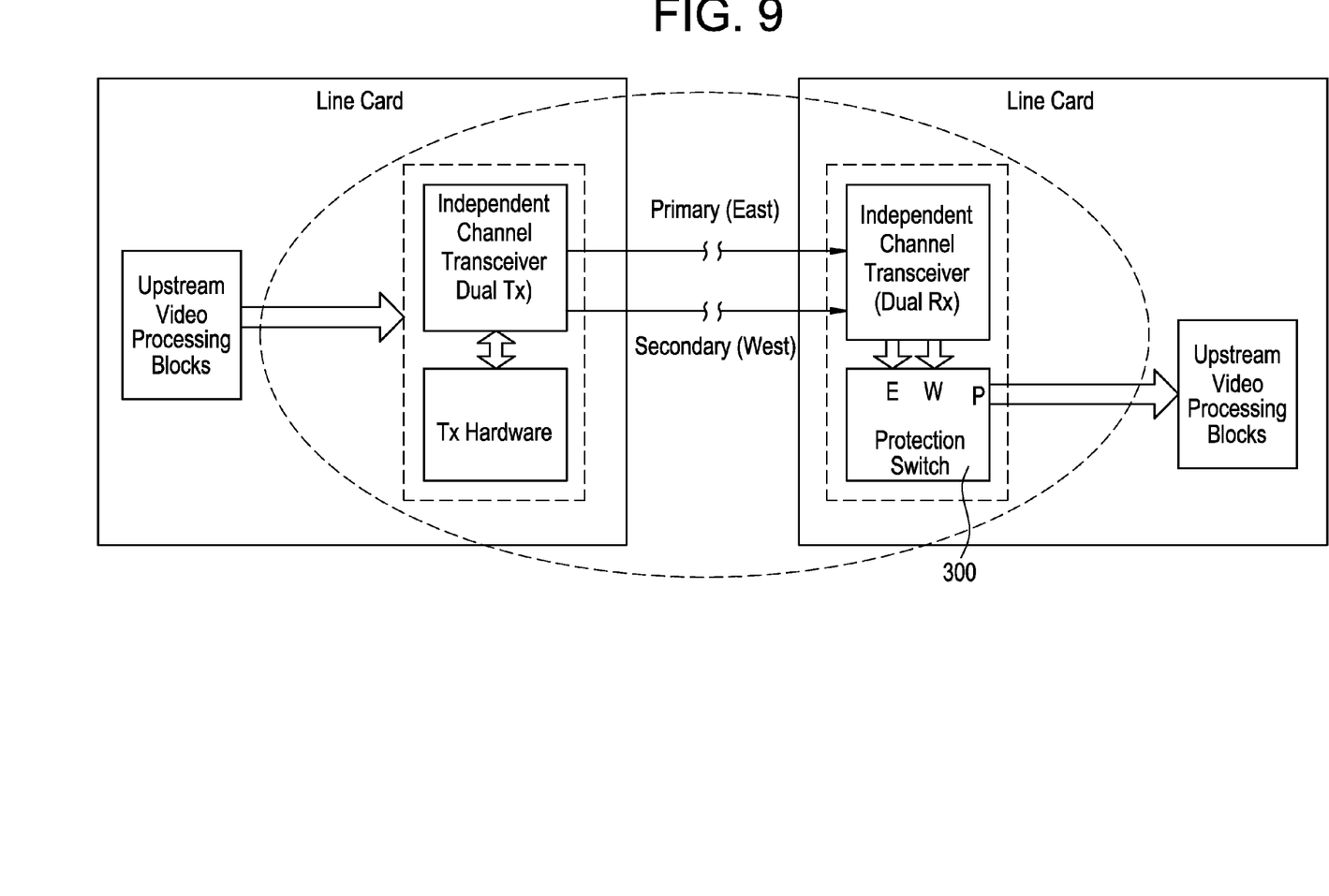
FIG. 9 illustrates a short distance configuration of an exemplary application of a data loss protection switch, in accordance with one embodiment of the present invention.

FIG. 9 illustrates an exemplary short distance configuration in accordance with one embodiment of the present invention. In this case a data loss protection switch is integrated into the same card where the video processing destination is present. In this application, the descrambled and framed data from protection multiplexer 2 (shown in FIG. 3) is transmitted to the video processing device on the same board in parallel format.

Figure 10:
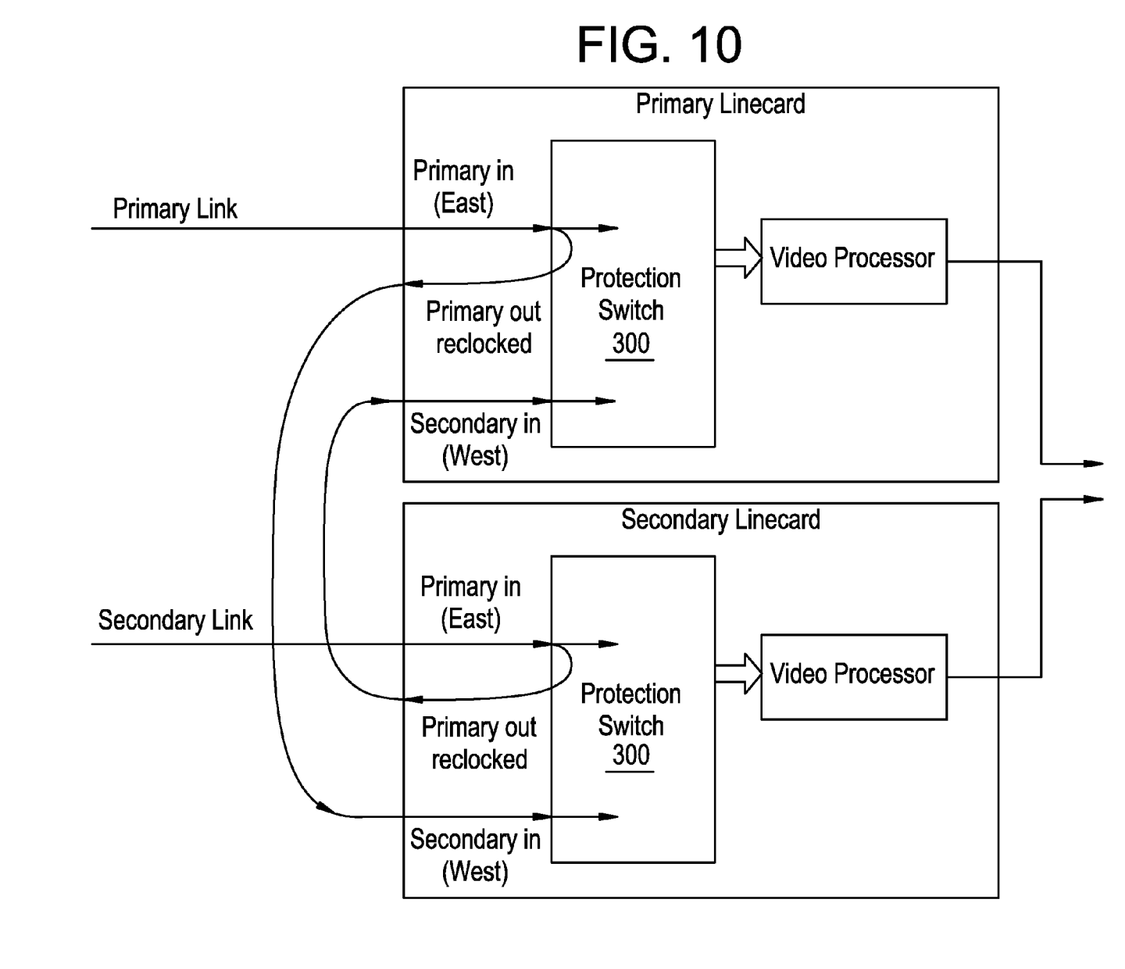
FIG. 10 illustrates an alternative application of data loss protection switches, in accordance with one embodiment of the present invention.

FIG. 10 illustrates another alternative exemplary application of data loss protection switches in accordance with one embodiment of the present invention. The embodiment of FIG. 10 beneficially enables both link-level and card-level redundancy, and at the same time provides lower data-loss than prior technology. The data availability to the end host in the event of either a link failure or card failure is increased.

Figure 11:
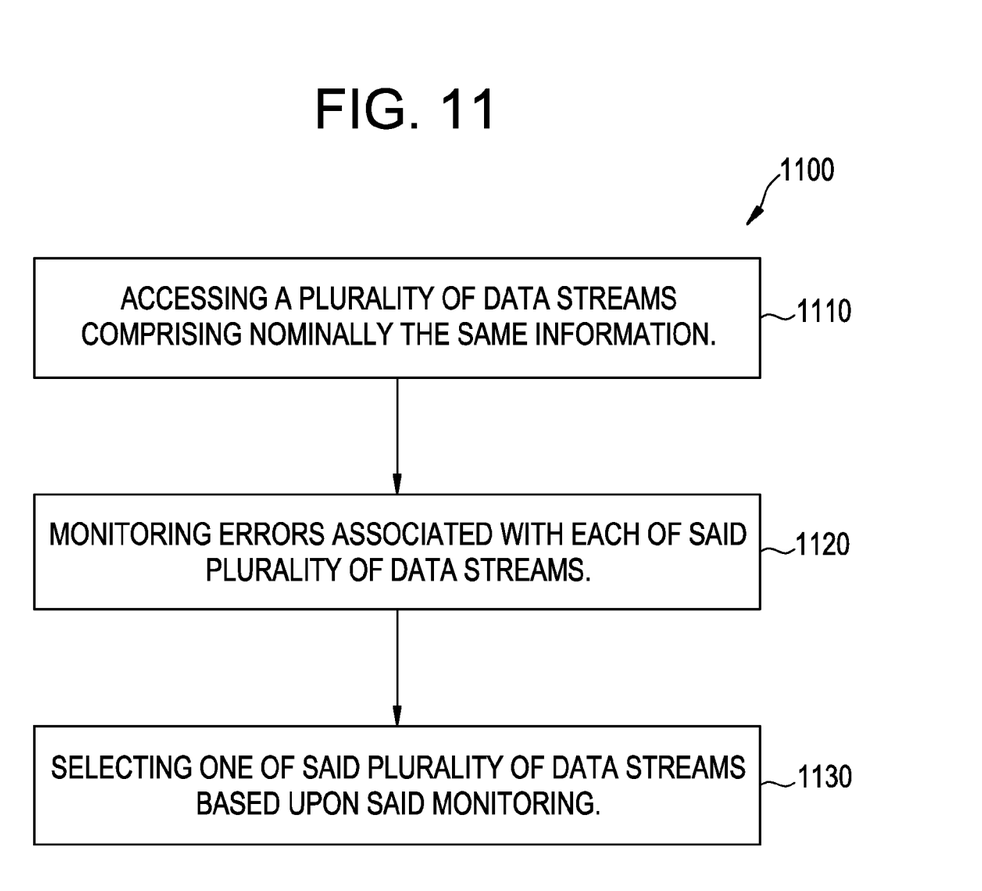
FIG. 11 is a flow chart of an exemplary data stream selection method in accordance with one embodiment of the present invention.

FIG. 11 is a flow chart of exemplary data stream selection method 1100 in accordance with one embodiment of the present invention. Data stream selection method 1100 facilitates efficient protected data communication.

In step 1110, a plurality of data streams comprising nominally the same information are accessed. In one embodiment, the accessing process includes a data format manipulation process. In one embodiment, data format manipulation process includes descrambling the plurality of data streams. The data format manipulation can also include performing a serializing and de-serializing process on the plurality of data streams. In one exemplary implementation, de-serialized data is received.

In step 1120, an error monitoring process is performed. In one embodiment errors associated with each of the plurality of data streams are monitored simultaneously. In one embodiment, the monitoring includes detecting line fault indications and/or data error status indications. The monitoring can also include carrier detect indications.

In step 1130 a data stream selection process is performed. In one embodiment, one of the plurality of data streams is selected based upon monitoring in step 1120.

Embodiments in accordance with the present invention are well suited to support of serial digital video standards including, but not limited to, SMPTE 292M and SMPTE 259M-C.

Advantageously, a switching action from a primary data stream to a secondary data stream (or vice versa) can be controlled to be almost instantaneous. In one embodiment, the time delay between the error limit exceeding the set threshold and the output switching to the alternate link is just a few clock cycles.

It is to be appreciated that both the primary and alternate link data can already be deserialized and framed and readily available to the video destination hardware. In one exemplary implementation, once the error limit exceeds a set threshold (as determined by the error management block), the protection multiplexer output is instantaneously switched to deliver the already formatted (descrambled and framed) version of the data from the alternate link.

As a result of the low switch-over times, the amount of video data lost during the switch can be lower than the conventional art. In the conventional art (e.g., as shown in FIG. 1) the link status of both the links are monitored by a device that is remote to either one or both cards. Hence, the communication delay of the error status between the link/error monitoring systems to the processing subsystem that sends stimulus to control the protection multiplexer in this method can be higher compared to the present invention. In accordance with one embodiment of the present invention, the error calculations, decision making hardware for controlling the protection multiplexer, and the protection multiplexer by itself are generally implemented in the same device. This makes the switch over extremely fast compared to the prior technology. Moreover, the present invention is dedicated to the role of protection switching and facilitates executing the decisions much faster in comparison to a protection system that uses a general purpose CPU that has extra processing overhead and might have other processes already running.

The link status and error status can be simultaneously monitored on both links by the same device. Hence the switch over to an alternate link can be controlled to occur if the error limit on the alternate link is also acceptable. This is useful in situations where data received from both primary and secondary links might be erroneous.

Although the embodiments in accordance with the present invention described herein have been directed to video transmission, it is to be appreciated that embodiments in accordance with the present invention are well suited to protection switching on other types of point-to-point data communication systems. The CRC error monitoring blocks may be replaced by a wide variety of error detection technologies, including, for example, 8B/10B code word violation monitoring, 8B/10B running disparity violation monitoring, parity error monitoring and/or other error detection or error correction mechanisms.

In cases in which the type of error detection deployed is different, the error management block may still control the protection multiplexers based on the number of errors received or error ratio as reported by the respective error detection block and as determined by the error management block. In one embodiment, the number of errors and/or error ratio on a link at which a switch over happens can be programmed. The switch over can be controlled to happen if the number of errors and/or error ratio of the alternate channel is 0, better than a current primary channel, and/or better than a threshold value.

In accordance with alternative embodiments of the present invention, a data loss protection switch can include a second multiplexer controlled by the error threshold management circuitry for selecting among the first and second scrambled data streams based on the determining.

In one embodiment, protection switching is performed using hardware that monitors error limits or link status from a plurality of links and switches the data. In one exemplary implementation, controlling hardware monitors CRC errors and link status simultaneously on a plurality of channels. Relatively fast or instantaneous switch over at error limits with much lower data-loss than conventional technology can be realized. The switching can be performed for deserialized data and/or descrambled/framed data. During the switch to an alternate channel, the data from the alternate channel is already available in one embodiment.

Thus, embodiments in accordance with the present invention provide systems and methods for data loss protection switches. While the present invention has been described in particular embodiments, it should be appreciated that the present invention should not be construed as limited by such embodiments, but rather construed according to the below claims.

What is claimed is:

1. A data loss protection switch comprising:
a first input port configured to receive video data from a first data stream originating at a video source;
a second input port configured to receive video data from a second data stream originating at the same video source;
an error threshold management component configured to analyze errors in said first data stream and said second data stream; and a multiplexer controlled by said error threshold management component configured to select among said first and second data streams based on said analysis to produce an output descrambled data stream corresponding to a descrambled data stream of said first and second data streams with the least errors.

2. The data loss protection switch of claim 1 wherein the video data received at the first port and the video data received at the second port each comprises deserialized data from serial digital video data streams.

3. The data loss protection switch of claim 2 wherein the video data are compatible with Society of Motion Picture Television Engineers (SMPTE) standard 259M.

4. The data loss protection switch of claim 2 wherein the video data are compatible with Society of Motion Picture Television Engineers (SMPTE) standard 292M.

5. The data loss protection switch of claim 1 wherein the error threshold management component is configured to receive line fault indications.

6. The data loss protection switch of claim 1 including error detection circuitry coupled to the first and second input ports, and wherein the error threshold management component is configured to receive cyclic redundancy check (CRC) data error detection status indications from the error detection circuitry.

7. The data loss protection switch of claim 1 including error detection circuitry coupled to the first and second input ports, and wherein the error threshold management component is configured to receive line fault indications and CRC data error status indications from the error detection circuitry.

8. The data loss protection switch of claim 1 including error detection circuitry coupled to the first and second input ports, the error detection circuitry configured to provide standard definition (SD) error detection and high definition (HD) CRC error detection indications to the error threshold management component.

9. A data stream selection system comprising:
a video data source coupled to a transmitter to feed separate video data streams comprising nominally the same information from the video data source to first and second video links each coupled to respective first and second input ports of a data loss protection switch; the switch further comprising:
first error detection circuitry coupled to the first input port to detect errors associated with video data received at the first input port and second error detection circuitry coupled to the second input port to detect errors associated with video data received at the second input port;
an error threshold management component coupled to the first and second error detection circuitry and to a multiplexer to enable the multiplexer to select and output the video data from the first port or the video data from the second port, the selected video data determined by analysis by the error threshold management component of link characteristics associated with transmission of the data streams over the first and second video links and of errors detected by the first and second error detection circuitry.

10. The data stream selection system of claim 9 wherein the error threshold management component is operable to enable the multiplexer to output descrambled video data or to enable the multiplexer to output scrambled video data.

11. The data stream selection system of claim 9 further comprising a descrambling component for descrambling video data in the data streams received at the respective first and second input ports.

12. The data stream selection system of claim 9 further comprising a video data serializer coupling said video data source to the first and second video data links, and a video data deserializer coupling the first and second video data links to the respective first and second input ports.

13. The data stream selection system of claim 9 wherein the video data streams are compatible with Society of Motion Picture Television Engineers (SMPTE) standard 259M.

14. The data stream selection system of claim 9 wherein the video data streams are compatible with Society of Motion Picture Television Engineers (SMPTE) standard 292M.

15. A data loss protection switch comprising:
a first input port configured to receive video data from a video data source;
a second input port configured to receive video data from said video data source;
first error detection circuitry coupled to the first input port to detect errors associated with the video data received at the first input port and second error detection circuitry coupled to the second input port to detect errors associated with the video data received at the second input port;
an error threshold management component coupled to the first and second error detection circuitry and to a multiplexer to enable the multiplexer to select and output the video data from the first port or the video data from the second port, the selected video data having higher quality as determined by the error threshold management component.

16. The data loss protection switch of claim 15 further comprising:
a first descrambling component configured to descramble video data from the first input port; and
a second descrambling component configured to descramble video data from the second input port.

* * * * *